(12) United States Patent
Bao et al.

(10) Patent No.: US 11,987,855 B2
(45) Date of Patent: May 21, 2024

(54) METHOD AND SYSTEM FOR DETERMINING CONVERTER TAPPING QUANTITY

(71) Applicant: UNIVERSITY OF SCIENCE AND TECHNOLOGY BEIJING, Beijing (CN)

(72) Inventors: Yanping Bao, Beijing (CN); Ruixuan Zheng, Beijing (CN); Lihua Zhao, Beijing (CN)

(73) Assignee: UNIVERSITY OF SCIENCE AND TECHNOLOGY BEIJING, Beijing (CN)

(*) Notice: Subject to any disclaimer, the term of this patent is extended or adjusted under 35 U.S.C. 154(b) by 0 days.

(21) Appl. No.: 18/308,784

(22) Filed: Apr. 28, 2023

(65) Prior Publication Data

US 2024/0002964 A1 Jan. 4, 2024

(30) Foreign Application Priority Data

Jul. 1, 2022 (CN) .......................... 202210767075.7

(51) Int. Cl.
*C21C 5/30* (2006.01)
*G06N 5/00* (2023.01)

(52) U.S. Cl.
CPC ................. *C21C 5/30* (2013.01); *G06N 5/00* (2013.01); *C21C 2300/06* (2013.01)

(58) Field of Classification Search
CPC ......... C21C 5/30; G06N 5/00; G21C 2300/06
(Continued)

(56) References Cited

U.S. PATENT DOCUMENTS

| 4,010,936 | A * | 3/1977 | Takashima | ........ C04B 35/63476 266/271 |
| 8,265,360 | B2 * | 9/2012 | Sornborger | ........ G01N 21/6408 382/128 |
| 2010/0023307 | A1* | 1/2010 | Lee | ..................... G06F 18/2321 703/7 |

FOREIGN PATENT DOCUMENTS

| CN | 111191725 A | 5/2020 |
| CN | 113919206 A | 1/2022 |
| CN | 114611844 A | 6/2022 |

OTHER PUBLICATIONS

Svyazhin et al., "Mixing of the Metal and Mass Transfer During the Tapping of a Semifinished product from an oxygen converter", Metallurgist, vol. 49, Nos. 11-12, 2005 (Year: 2005).*

(Continued)

*Primary Examiner* — Tsu-Chang Lee (57) ABSTRACT

The invention relates to a method and a system for determining the steel-tapping quantity of a converter, which consider that the working environment of the steel-making process of the converter is severe, the measurement is difficult and the interference of other factors is large, and provide a data-driven prediction model based on data, combine a Principal Component Analysis (PCA) with a RBF neural network, find the relation and the internal relation among variables by carrying out mathematical analysis on the related internal structure of the original variables, can quickly and accurately realize the prediction of the steel-tapping quantity of the converter, improve the component hit rate and the product stability in the steel-making process of the converter, are beneficial to realizing the control of narrow regions of steel-making components, save the alloying cost and have good application prospects in the field of ferrous metallurgy.

6 Claims, 3 Drawing Sheets

(58) Field of Classification Search
USPC .......................................................... 706/45
See application file for complete search history.

(56) References Cited

OTHER PUBLICATIONS

First Examination Report and Search Report of CNIPA.
Notice of Allowance from CNIPA and Allowed Claims.

* cited by examiner

METHOD AND SYSTEM FOR DETERMINING CONVERTER TAPPING QUANTITY

FIELD OF THE DISCLOSURE

The invention relates to the technical field of ferrous metallurgy, in particular to a method and a system for determining the tapping quantity of a converter.

BACKGROUND OF THE DISCLOSURE

Steelmaking is a complex physical and chemical process, wherein the prediction of converter tapping amount is always the difficult point and the key point of research in the technical field of ferrous metallurgy. The converter tap weight cannot be weighed by the weighing system before tapping is complete and cannot be controlled by leaving steel, for example in an electric arc furnace. Therefore, the steel tapping amount in the converter steel tapping process is an unknown parameter, but most of ferroalloy in the current long-flow steel making process needs to be added in the converter steel tapping process, the adding amount of the ferroalloy is calculated according to the steel tapping amount, and the significance of converter steel tapping amount prediction is great.

At present, steel enterprises mainly rely on manual experience to predict converter tapping quantity, in converter steelmaking, the mixing quality of molten iron and scrap steel of different batches has great difference, and in addition, operations such as splashing, slag skimming and the like in a blowing process can cause inaccurate converter tapping quantity prediction.

With the rapid development of scientific technology, the field of ferrous metallurgy enters the era of intelligent manufacturing, and the converter steelmaking control technology gradually develops from an empirical formula and static control to big-data intelligent control. However, the prediction of the tapping amount of the converter has not yet formed an effective method and means, and tapping in the prior art is only a single-purpose operation of pouring molten steel into a ladle under the condition of controlling slag inclusion per se for the converter, and the attention on the tapping amount of the converter is less.

SUMMARY OF THE DISCLOSURE

The invention mainly aims to provide a method and a system for determining the steel tapping quantity of a converter, and aims to solve the problem that the steel tapping quantity is difficult to predict in the steel tapping process of the converter at present.

In order to solve the above technical problems, according to one aspect of the present invention, the present invention provides the following technical solutions:

A converter tapping amount determining method comprises the following steps:
  s1. collecting a converter production data set, and establishing a prediction model database;
  s2. screening and elutriating the acquired converter production data set, and preprocessing the screened and elutriated data;
  s3. determining process parameter variables influencing the converter tapping quantity as input variables of the model;
  s4. carrying out Principal Component Analysis (PCA) dimensionality reduction on the converter production process data;
  s5. establishing a RBF neural network converter steel tapping quantity prediction model;
  s6. training and testing a prediction model;
  s7. collecting real-time data of a field smelting process;
  s8. carrying out Principal Component Analysis (PCA) dimensionality reduction processing on the acquired real-time data;
  s9. substituting the prediction model into the RBF neural network converter tapping quantity to predict the converter tapping quantity;
  S10. adding ferroalloy in the tapping process according to the converter tapping amount prediction result, storing the data into a prediction model database after tapping, and periodically updating the prediction model.

As a preferable aspect of the method for determining the converter tap-out amount according to the present invention, the method comprises: in step S1, the converter production data set includes:

Production date, batch number, team information, steel type, steel ladle state, steel ladle number, converting period, oxygen supply time, total oxygen amount, slag alkalinity, molten iron temperature, molten iron weight, steel scrap category, carbon blowing temperature, slag charge addition amount, sublance detection information, furnace reversing times, splashing times, drying returning times, end point test components and the like.

As a preferable aspect of the method for determining the converter tap-out amount according to the present invention, the method comprises: in step S2, the data screening and elutriating of the collected converter production data set specifically includes:
  deleting repeated data, deleting abnormal points and extreme abnormal points, wherein the judgment of the abnormal data is as follows:

$$\begin{cases} x_i > U + 1.5\ IQR \mid x_i < L + 1.5\ IQR & \text{Abnormal points} \\ IQR = U - L \\ x_i > U + 3\ IQR \mid x_i < L + 3\ IQR & \text{Extreme anomaly points} \end{cases} \quad (1)$$

Where, $x_i$ refers to the ith data after the data to be tested is sorted from small to large, U refers to the upper quartile, L refers to the lower quartile, and IQR refers to the interquartile distance.

As a preferable aspect of the method for determining the converter tap-out amount according to the present invention, the method comprises: in step S2, the preprocessing the data after the screening and elutriation includes: normalizing the data set to [−1,1], and processing the data set in a specific way as shown in formula (2):

$$x'_{ij} = \frac{x_{ij} - \text{mean}(x_{ij})}{\max(x_{ij}) - \min(x_{ij})} \quad (2)$$

Where $x_{ij}$ is the raw data of the production data sample; $x'_{ij}$ is the normalized data; i represents the ith sample point; j represents the jth input variable; $\min(x_{ij})$, $\max(x_{ij})$ and $\text{mean}(x_{ij})$ are the minimum, maximum, and average values in the original data sample, respectively.

As a preferable aspect of the method for determining the converter tap-out amount according to the present invention, the method comprises: in the step S2, the converter production data set is represented by (7-8): and (2-3) distinguishing the training set from the verification set.

As a preferable aspect of the method for determining the converter tap-out amount according to the present invention, the method comprises: in the step S3, the method for determining the input variables of the model is to analyze the correlation between the process parameter variables and the converter tap-off quantity in the step S1 by a bivariate correlation analysis method, specifically to perform Pearson correlation analysis, and determine the input variables according to a Pearson correlation coefficient and a significance index.

As a preferable aspect of the method for determining the converter tap-out amount according to the present invention, the method comprises: in step S4, the Principal Component Analysis (PCA) is a classical multivariate statistical technique for reducing the dimensionality of data by summarizing the characteristics of the data, and the processed data is transformed into a new set of principal component variables, which are uncorrelated and ordered.

As a preferable aspect of the method for determining the converter tap-out amount according to the present invention, the method comprises: in step S5, the RBF neural network is as follows:

$$y = \Sigma_{k=1}^{K} w_k \theta_k(x) \quad (3)$$

Where, $x=(x_1, x_2, \ldots, x_M)^T$ represents the input variable of the network, M is the number of input variables; y represents the output of the network, $w=(w_1, w_2, \ldots, w_M)^T$ represents the connection weights of the hidden layer neurons and the output layer; $\theta_k(x)$ is the output value of the k th hidden layer neuron.

As a preferable aspect of the method for determining the converter tap-out amount according to the present invention, the method comprises: in step S5, the RBF neural network uses a gaussian function as a radial basis function, and selects neurons for determining the RBF neural network by an orthogonal least square method, so as to determine the hidden layer of the RBF neural network.

As a preferable aspect of the method for determining the converter tap-out amount according to the present invention, the method comprises: in the step S7, the method for acquiring real-time data of the field smelting process includes acquiring the real-time data from Oracle databases of the inspection and testing system and the secondary system by establishing ODBC connection.

In order to solve the above technical problem, according to another aspect of the present invention, the present invention provides the following technical solutions:

Another object of the present invention is to provide a system for determining the tapped amount of a converter, which implements the method for determining the tapped amount of a converter.

Another object of the present invention is to provide an information data processing terminal for implementing the method for determining the tapped steel amount of the converter.

Another object of the present invention is to provide a computer-readable storage medium, comprising instructions which, when run on a computer, cause the computer to execute the above method for determining a tapping quantity of a converter.

The invention has the following beneficial effects:

The invention provides a method and a system for determining the converter steel-tapping quantity, which combine a Principal Component Analysis (PCA) method with an RBF neural network, find the relation and the internal relation among variables by carrying out mathematical analysis on the related internal structure of the original variables, can quickly and accurately realize the prediction of the converter steel-tapping quantity, improve the component hit rate and the product stability in the converter steel-making process, are beneficial to realizing the narrow-range control of steelmaking components, save the alloying cost and have good application prospects in the field of steel metallurgy.

BRIEF DESCRIPTION OF DRAWINGS

In order to more clearly illustrate the embodiments of the present invention or the technical solutions in the prior art, the drawings used in the description of the embodiments or the prior art will be briefly described below, it is obvious that the drawings in the following description are only some embodiments of the present invention, and for those skilled in the art, other drawings can be obtained according to the structures shown in the drawings without creative efforts.

The implementation, functional features and advantages of the objects of the present invention will be further explained with reference to the accompanying drawings.

DETAILED DESCRIPTION OF THE DISCLOSURE

The following will clearly and completely describe the technical solutions in the embodiments, and obviously, the described embodiments are only a part of the embodiments of the present invention, and not all embodiments. All other embodiments, which can be obtained by a person skilled in the art without inventive step based on the embodiments of the present invention, are within the scope of protection of the present invention.

The method and the system for determining the converter steel-tapping quantity can quickly and accurately predict the converter steel-tapping quantity, improve the component hit rate and the steel product stability in the converter steel-making process, are favorable for realizing narrow-interval control of steel-making components, save alloying cost and have good application prospects in the field of ferrous metallurgy. A principal component analysis method is combined with a RBF neural network, and a data-driven prediction model based on data is provided in consideration of severe working environment, difficulty in measurement and large interference of other factors in the converter steelmaking process, and the relation and the internal relation among variables are found by performing mathematical analysis on the related internal structure of the original variables. The Principal Component Analysis (PCA) is adopted to perform dimensionality reduction processing on the converter production process data, so that the problems of strong correlation among converter steelmaking variables and high data analysis complexity are solved. The RBF neural network overcomes the defects that the convergence rate is low, the number of hidden layers and hidden layer nodes is difficult to determine, the network structure cannot be changed after training is completed and the like in the traditional neural network learning process, is high in RBF neural network learning speed, can dynamically determine the network structure and the hidden layer units, supports online and offline training, and is very suitable for the problem of fast-rhythm online prediction in the converter steelmaking process.

Radial Basis Function Neural networks (RBF Neural networks) are a common class of three-layer feed-forward networks that can be used for both Function approximation and pattern classification. Compared with other types of artificial neural networks, the RBF network has the characteristics of physiological basis, simple structure, high learning speed, excellent approximation performance, generalization capability and the like.

Different from BP neural network, RBF neural network can adjust network topology structure according to actual conditions, has self-learning, self-organization and self-adaptation functions, has consistent approximability to non-linear continuous functions in the industrial production process, has high learning speed, can perform large-scale data fusion, can process data at high speed in parallel, and is suitable for solving the problems of converter steelmaking production, large data volume and more data variables.

Figure 1:
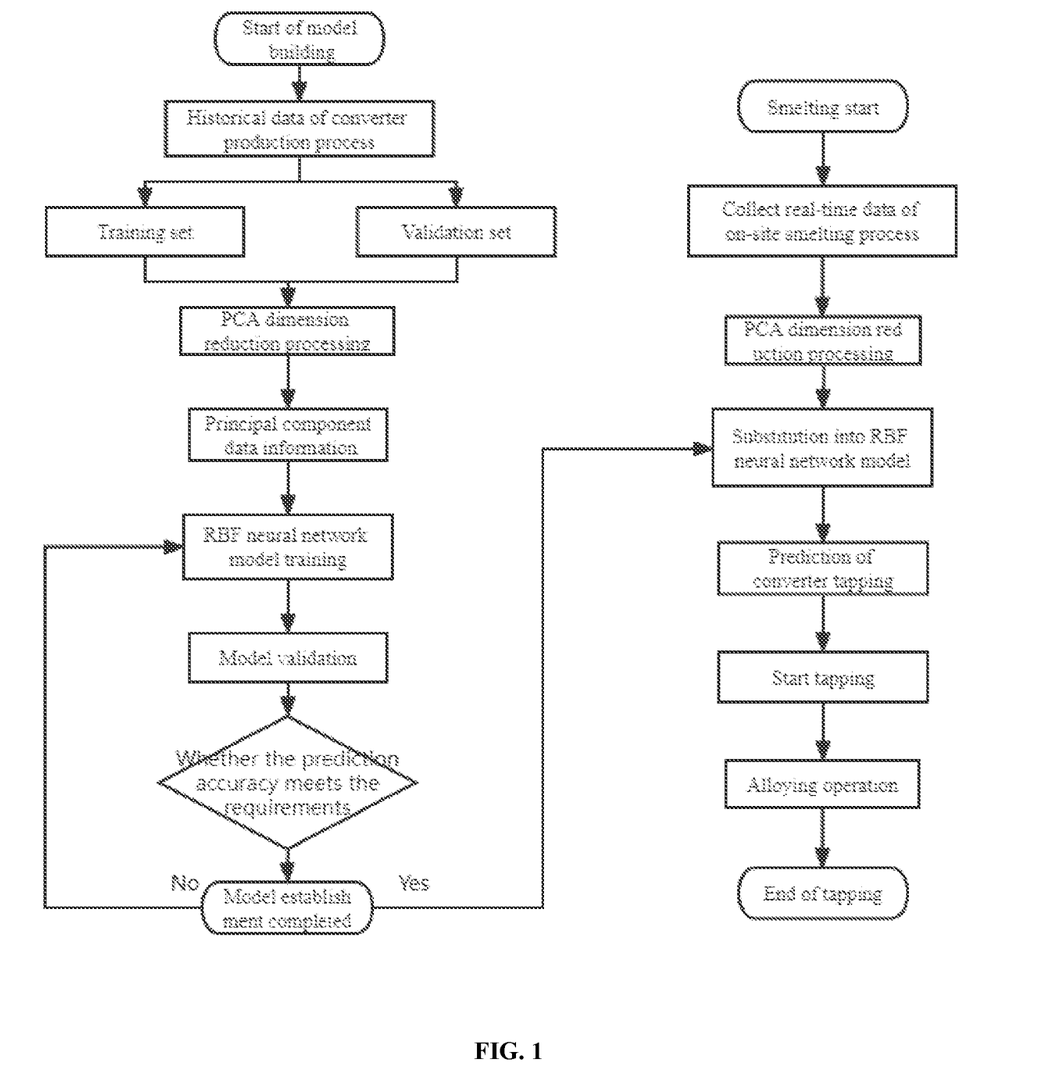
FIG. 1 is a schematic flow chart of a method for determining the tapping amount of a converter according to the present invention.

According to one aspect of the invention, the invention provides the following technical scheme:

As shown in the attached FIG. 1, the method for determining the tapping quantity of the converter comprises the following steps:

S1. collecting a converter production data set, and establishing a prediction model database;

S2. screening and elutriating the acquired converter production data set, and preprocessing the screened and elutriated data; the converter production data set is as follows (7-8): (2-3) differentiating the training set and the verification set in proportion;

S3. determining process parameter variables influencing the converter tapping quantity as input variables of the model;

S4. carrying out Principal Component Analysis (PCA) dimensionality reduction on the converter production process data;

S5. establishing a RBF neural network converter steel tapping quantity prediction model;

S6. training and testing a prediction model;

S7. collecting real-time data of a field smelting process;

S8. carrying out Principal Component Analysis (PCA) dimensionality reduction processing on the acquired real-time data;

S9. substituting the prediction model into the RBF neural network converter tapping quantity to predict the converter tapping quantity;

S10. adding ferroalloy in the tapping process according to the converter tapping amount prediction result, storing the data into a prediction model database after tapping, and periodically updating the prediction model.

In step S1, the converter production data set includes: production date, batch number, team information, steel type, steel ladle state, steel ladle number, converting period, oxygen supply time, total oxygen amount, slag alkalinity, molten iron temperature, molten iron weight, steel scrap category, carbon blowing temperature, slag charge addition amount, sublance detection information, furnace reversing times, splashing times, drying returning times, end point test components and the like.

In step S2, the data screening and elutriating of the collected converter production data set specifically includes:

Deleting repeated data, deleting abnormal points and extreme abnormal points, wherein the judgment of the abnormal data is as follows:

$$\begin{cases} x_i > U + 1.5 \ IQR \mid x_i < L + 1.5 \ IQR & \text{Abnormal points} \\ IQR = U - L \\ x_i > U + 3 \ IQR \mid x_i < L + 3 \ IQR & \text{Extreme anomaly points} \end{cases} \quad (1)$$

Where, $x_i$ refers to the ith data after the data to be tested is sorted from small to large, U refers to the upper quartile, L refers to the lower quartile, and IQR refers to the inter-quartile distance.

In step S2, the preprocessing the data after the screening and elutriation includes:

Firstly, converting nominal variables such as carbon blowing pulling temperature, scrap steel type, ladle state, ladle number and the like into natural numbers, for example, whether the carbon blowing pulling temperature is represented by 0 and 1, light waste is represented by 1, heavy waste is represented by 2 and the like;

The scale variables such as oxygen supply time, total oxygen amount, slag alkalinity, molten iron temperature and the like are normalized to [−1,1], and the specific processing mode is shown is formula (2):

$$x'_{ij} = \frac{x_{ij} - \text{mean}(x_{ij})}{\max(x_{ij}) - \min(x_{ij})} \quad (2)$$

Where $x_{ij}$ is the raw data of the production data sample; $x'_{ij}$ is the normalized data; i represents the ith sample point; j represents the jth input variable; $\min(x_{ij})$, $\max(x_{ij})$ and $\text{mean}(x_{ij})$ are the minimum, maximum, and average values in the original data sample, respectively.

In the step S3, the method for determining the input variables of the model is to analyze the correlation between the process parameter variables and the converter tap-off quantity in the step S1 by a bivariate correlation analysis method, specifically to perform Pearson correlation analysis, and determine the input variables according to a Pearson correlation coefficient and a significance index.

In step S4, the Principal Component Analysis (PCA) is a classical multivariate statistical technique for reducing the dimensionality of data by summarizing the characteristics of the data, and the processed data is transformed into a new set of principal component variables, which are uncorrelated and ordered.

Figure 2:
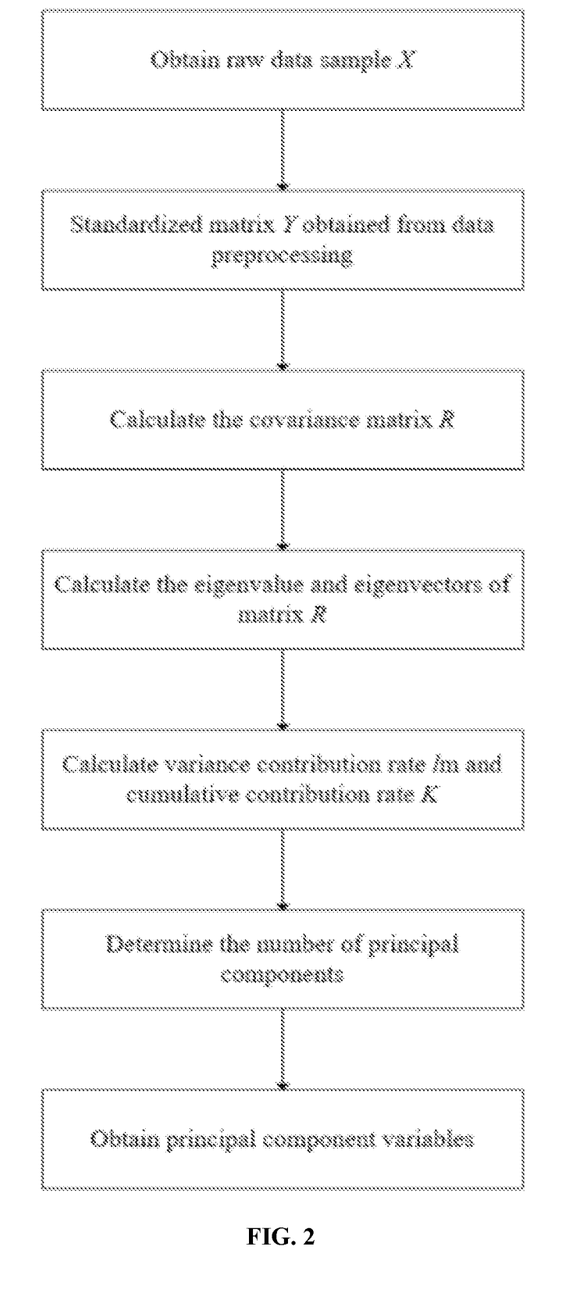
FIG. 2 is a principal component analysis process flow diagram.

As shown in FIG. 2, the principal component analysis method comprises the following processing steps:

1) carrying out data standardization processing to obtain a standardization matrix;
2) calculating a correlation coefficient matrix of the standardized matrix;
3) solving the eigenvalue and eigenvector of the solution correlation coefficient matrix;
4) calculating variance contribution rate and variance accumulated contribution rate of the principal component variables;
5) and selecting the first m principal component variables with the variance cumulative contribution rate of more than 80 percent as the target variables after dimensionality reduction.

Figure 3:
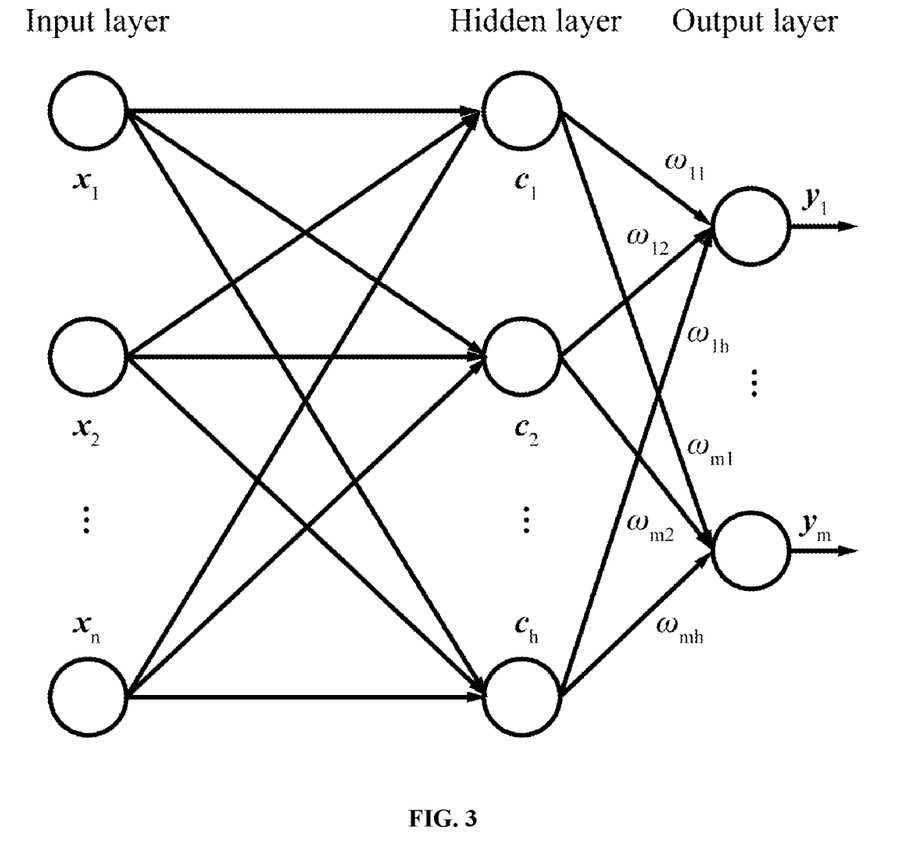
FIG. 3 is a schematic diagram of an RBF neural network structure.

In step S5, as shown in FIG. 3, the RBF neural network is represented by formula (3):

$$y = \Sigma_{k=1}^{K} w_k \theta_k(x) \quad (3)$$

Where, $x=(x_1, x_2, \ldots, x_M)^T$ represents the input variable of the network, M is the number of input variables; y represents the output of the network, $w=(w_1, w_2, \ldots, w_M)^T$ represents the connection weights of the hidden layer neurons and the output layer; $\theta_k(x)$ is the output value of the k th hidden layer neuron.

In step S5, the RBF neural network uses a gaussian function as a radial basis function, and selects neurons for determining the RBF neural network by an orthogonal least square method, so as to determine a hidden layer of the RBF neural network.

In the step S7, the method for acquiring real-time data of the field smelting process includes acquiring the real-time data from Oracle databases of the inspection and testing system and the secondary system by establishing ODBC connection.

Another object of the present invention is to provide a system for determining the tapped amount of a converter, which implements the method for determining the tapped amount of a converter.

Another object of the present invention is to provide an information data processing terminal for implementing the method for determining the tapped steel amount of the converter.

Another object of the present invention is to provide a computer-readable storage medium, comprising instructions which, when run on a computer, cause the computer to execute the above method for determining a tapping quantity of a converter.

Example 1

In a 50 t top-bottom combined blown converter of a certain steel plant, the average tapping weight is 50.3 t, the tapping weight of each converter is distributed in the range of 41.6-t, the tapping weight fluctuation is large, and the post-converter alloying operation difficulty of the converter is large. Meanwhile, field operation workers lack reasonable prediction means, and the steel tapping amount of the converter is estimated by virtue of an empirical formula under most conditions, so that the prediction precision is low, and when the steel tapping weight fluctuates, the ferroalloy added according to the normal steel tapping amount is not reasonable. If the tapping weight is too small, the alloy addition amount is surplus, so that ferroalloy raw materials are wasted, and even component overproof accidents can occur when the tapping amount is too small; if the weight of the steel is too large, the alloy addition is insufficient, secondary alloying is needed to supplement the component deficiency, and the production rhythm is influenced. Therefore, the accurate prediction of the converter tapping quantity has important significance for smooth production of the converter, saving of production cost and improvement of the stability of molten steel components.

11802 groups of production data of 50 t converters in the plant are collected, repeated data are deleted, abnormal points and extreme abnormal points are deleted, and the evaluation formula of the abnormal data is as follows:

$$\begin{cases} x_i > U + 1.5 \ IQR \mid x_i < L + 1.5 \ IQR & \text{Abnormal points} \\ IQR = U - L \\ x_i > U + 3 \ IQR \mid x_i < L + 3 \ IQR & \text{Extreme anomaly points} \end{cases} \quad (1)$$

Where, $x_i$ refers to the ith data after the data to be tested is sorted from small to large, U refers to the upper quartile, L refers to the lower quartile, and IQR refers to the inter-quartile distance.

8627 groups of effective data are obtained after screening. In order to enable different variables to have the same measurement scale, the data are normalized and are mapped into the range of $[-1,1]$;

$$x'_{ij} = \frac{x_{ij} - \text{mean}(x_{ij})}{\max(x_{ij}) - \min(x_{ij})} \quad (2)$$

Where $x_{ij}$ is the raw data of the production data sample; $x'_{ij}$ is the normalized data; i represents the ith sample point; j represents the jth input variable; $\min(x_{ij})$, $\max(x_{ij})$ and $\text{mean}(x_{ij})$ are the minimum, maximum, and average values in the original data sample, respectively.

According to Pearson correlation analysis, determining process parameters which have obvious influence on converter tapping quantity as input variables of the model:

TABLE 1

Pearson correlation analysis results.

| Input variables | Unit | Input variables | Unit |
|---|---|---|---|
| Splash or not | — | Supplementary blowing or not | — |
| Alkalinity | — | Iron temperature | ° C. |
| Molten iron weight | t | Weight of scrap steel | t |
| Oxygen supply time | s | Oxygen consumption | m³ |

The variables were subjected to correlation analysis dimensionality reduction, and the principal component variable eigenvalues and variance contribution rates obtained are shown in Table 2

TABLE 2

Principal component variable eigenvalues and variance contribution rates.

| Principal component | Characteristic value | Variance contribution rate/% | Cumulative variance contribution rate/% |
|---|---|---|---|
| 1 | 1.794 | 29.902 | 29.902 |
| 2 | 1.243 | 20.720 | 50.622 |
| 3 | 1.018 | 16.970 | 67.592 |
| 4 | 0.972 | 16.196 | 83.788 |
| 5 | 0.621 | 10.357 | 94.145 |
| 6 | 0.351 | 5.855 | 100.000 |

Selecting the first 4 principal component variables with the accumulated variance contribution rate larger than 80% as the reduced-dimension target variables, using the target variables as input variables of the RBF neural network, establishing a converter steel-tapping quantity prediction model, using a Gaussian function as a radial basis function, and selecting and determining neurons of the RBF neural network by using an orthogonal least square method so as to determine the hidden layer of the RBF neural network. And (3) enabling 8627 groups of data 6900 obtained after screening to be used for training the model, and 1727 groups of data to be used for testing the model so as to verify the effect of the model, and continuously adjusting parameters of the network to obtain a prediction model with the best prediction effect.

The performance of the tap-quantity prediction model was evaluated using four performance indicators, including Mean Absolute Error (MAE), Mean Square Error (MSE), Root Mean Square Error (RMSE), Mean Absolute Percent Error (MAPE), and coefficient of determination ($R^2$) The detailed results are shown in Table 3.

TABLE 3

Test data set prediction error and coefficient of determination

| Method | MAE | RMSE | MSE | MAPE(%) | $R^2$ |
|---|---|---|---|---|---|
| PCA-RBF neural network | 0.0084 | 0.0201 | 0.000404 | 0.0489 | 0.9894 |

According to the evaluation result and the fitting performance of the model on the training data set, the PCA-RBF neural network can well fit the original data and has good prediction performance on the test set.

In the above embodiments, all or part of the implementation may be realized by software, hardware, firmware, or any combination thereof. When used in whole or in part, can be implemented in a computer program product that includes one or more computer instructions. When loaded or executed on a computer, cause the flow or functions according to embodiments of the invention to occur, in whole or in part. The computer may be a general purpose computer, a special purpose computer, a network of computers, or other programmable device. The computer instructions may be stored in a computer readable storage medium or transmitted from one computer readable storage medium to another, for example, the computer instructions may be transmitted from one website site, computer, server, or data center to another website site, computer, server, or data center via wire (e.g., coaxial cable, fiber optic, Digital Subscriber Line (DSL), or wireless (e.g., infrared, wireless, microwave, etc.)). The computer-readable storage medium can be any available medium that can be accessed by a computer or a data storage device, such as a server, a data center, etc., that includes one or more of the available media. The usable medium may be a magnetic medium (e.g., floppy Disk, hard Disk, magnetic tape), an optical medium (e.g., DVD), or a semiconductor medium (e.g., Solid State Disk (SSD)), among others.

The invention combines a principal component analysis method with the RBF neural network, considers the severe working environment, difficult measurement and large interference of other factors in the converter steelmaking process, provides a data-driven prediction model based on data, and finds the relation and the internal relation among variables by performing mathematical analysis on the related internal structure of the original variables. The principal component analysis method is adopted to perform dimensionality reduction processing on converter production process data, and the problems of strong correlation among converter steelmaking variables and high data analysis complexity are solved. The RBF neural network overcomes the defects that the convergence speed is low in the learning process of the traditional neural network, the number of hidden layers and hidden layer nodes is difficult to determine, the network structure cannot be changed after training is finished, and the like. The RBF neural network has high learning speed, can dynamically determine a network structure and hidden layer units, supports on-line and off-line training, and is very suitable for the problem of fast-rhythm on-line prediction in the converter steelmaking process. The method can quickly and accurately predict the steel output of the converter, improves the component hit rate and the steel product stability in the converter steel-making process, is beneficial to realizing narrow-interval control of steel-making components, saves the alloying cost, and has good application prospect in the field of ferrous metallurgy. The method is checked through actual production data on site, and the result shows that the method has better accuracy and applicability and can provide beneficial guidance for the production process of the converter steelmaking site.

The above description is only a preferred embodiment of the present invention, and not intended to limit the scope of the present invention, and all modifications and equivalents of the present invention, which are made by the present specification and directly/indirectly applied to other related technical fields within the spirit of the present invention are included in the scope of the present invention.

What is claimed is:

1. A method for determining tapping amount of a converter, comprising following steps:
    S1, collecting a converter production data set and establishing a prediction model database; the converter production data set includes: blowing cycle, oxygen supply time, total oxygen content, whether to blow carbon or not;
    S2, conducting data screening and elutriation on the collected converter production data set, and conducting normalization preprocessing on the screened and elutriated data;
    S3, determining process parameter variables that affect tapping amount of the converter as input variables to a prediction model of RBF neural network for converter tapping capacity;
    the step S3 comprises: determining the input variables by conducting a bivariate correlation analysis to examine a relationship between process parameter variables in step S1 and the tapping amount of the converter;
    S4, performing dimensionality reduction processing on converter production process data using principal component analysis (PCA);
    the principal component analysis comprises:
        1) data standardization processing, and an obtained standardization matrix;
        2) calculating a correlation coefficient matrix of the standardization matrix;
        3) solving an eigenvalues and eigenvectors of the correlation coefficient matrix;
        4) calculating a variance contribution rate and a cumulative variance contribution rate of the principal component variables;
        5) selecting first m principal component variables with a cumulative variance contribution rate greater than 80% as the target variable after dimensionality reduction;
    S5, establishing the prediction model of RBF neural network for converter tapping capacity;
    S6, training and testing the prediction model;
    S7, collecting real-time data of on-site smelting process;
    S8, performing dimensionality reduction processing on the collected real-time data using the principal component analysis;
    S9, applying the prediction model based on RBF neural network to predict the tapping amount of the converter;
    S10, adding ferroalloy during the tapping process based on the tapping amount obtained by the prediction model; after the tapping process, storing the tapping amount in the prediction model database to update the prediction model based on the RBF neural network.

2. The method according to claim 1, wherein the step of conducting data screening and elutriation on the collected converter production data set in step S2 comprises:

deleting duplicate data, deleting abnormal points and extreme abnormal points; wherein the abnormal points and extreme abnormal points are determined by formula (1) as follows:

$$\begin{cases} x_i > U + 1.5\ IQR \mid x_i < L + 1.5\ IQR & \text{Abnormal points} \\ IQR = U - L \\ x_i > U + 3\ IQR \mid x_i < L + 3\ IQR & \text{Extreme anomaly points} \end{cases} \quad (1)$$

where, $x_i$ refers to the ith data after the data to be tested is sorted from small to large, U refers to the upper quartile, L refers to the lower quartile, and IQR refers to interquartile distance.

3. The method according to claim 1, wherein conducting normalization preprocessing on the screened and elutriated data in step S2 comprises:

normalizing the converter production dataset to [−1, 1] as formula (2):

$$x'_{ij} = \frac{x_{ij} - \text{mean}(x_{ij})}{\max(x_{ij}) - \min(x_{ij})} \quad (2)$$

Where $x_{ij}$ is raw data of a production data sample; $x'_{ij}$ is normalized data; i represents the ith sample point; j represents the jth input variable; $\min(x_{ij})$, $\max(x_{ij})$ and $\text{mean}(x_{ij})$ are the minimum, maximum, and average values in the raw data of the production data sample, respectively.

4. The method according to claim 1, wherein the principal component analysis is a classical multivariate statistical technique that reduces data dimensions by summarizing the characteristics of the data, and the processed data is converted into a new set of principal component variables, the variables being uncorrelated and orderly.

5. The method according to claim 1, wherein the RBF neural network is as formula (3):

$$y = \Sigma_{k=1}^{K} w_k \theta_k(x) \quad (3)$$

where, $x=(x_1, x_2, \ldots, x_M)^T$ represents the input variable of the RBF neural network, M is number of input variables; y represents output of the RBF network, $w=(w_1, w_2, \ldots, w_M)^T$ represents the connection weights of the hidden layer neurons and the output layer; $\theta_k(x)$ is the output value of the k th hidden layer neuron.

6. The method according to claim 1, wherein the RBF neural network uses Gaussian function as a radial basis function, and uses orthogonal least square method to select neurons to determine the RBF neural network to determine the hidden layer of the RBF neural network.

* * * * *